United States Patent [19]

Brenke et al.

[11] 4,384,303
[45] May 17, 1983

[54] ARRANGEMENT FOR DETERMINING THE WIDTH OF ROLLING MILL PRODUCTS

[75] Inventors: Manfred Brenke; Jürgen Ihlefeldt; Hermann-Josef Kopineck; Wilhelm Tappe, all of Dortmund, Fed. Rep. of Germany

[73] Assignee: Hoesch Werke Aktiengesellschaft, Dortmund, Fed. Rep. of Germany

[21] Appl. No.: 22,608

[22] Filed: Mar. 21, 1979

[30] Foreign Application Priority Data

May 3, 1978 [DE] Fed. Rep. of Germany ....... 2819395

[51] Int. Cl.$^3$ .............................................. H04N 7/18
[52] U.S. Cl. .................................... 358/107; 358/101; 356/386; 250/223 R; 250/560
[58] Field of Search ............... 358/107, 100, 101, 229, 358/212, 106; 356/384, 385, 386; 250/560, 239, 223 R, 223 B

[56] References Cited

U.S. PATENT DOCUMENTS

| | | | |
|---|---|---|---|
| 3,653,770 | 4/1972 | Yamamuro | 250/560 |
| 3,983,403 | 9/1976 | Dahlstrom et al. | 250/223 |
| 4,105,925 | 8/1978 | Rossol et al. | 250/560 |

FOREIGN PATENT DOCUMENTS 150889 11/1960 U.S.S.R. ............................. 358/107

OTHER PUBLICATIONS

Jurgen Ihlefeldt et al. "Control of Width of Hot-Rolled Strip in the Entry End of a Pickling Line With the Aid of Diode Line Detectors and Adapted Data Processing", Stahl U. Eisen, vol. 4, 2-24-77.

Peter Bohlander "Determination of Position, Size, and Temperature Distribution of Hot Rolling Stock With the Aid of Self-Scanning Photodiodes Lines" *Stahl and Eisen,* Sep. 22, 1977.

*Primary Examiner*—Benedict V. Safourek
*Assistant Examiner*—Edward L. Coles
*Attorney, Agent, or Firm*—Max Fogiel

[57] ABSTRACT

A method for the continuous, quasi-static and contactless determination of the width of hot rolled products within a rolling mill train, preferably of hot wide band, via diode line cameras on which the two side edges of the illuminated rolling mill product are projected. The position of the illuminated edges of the rolling mill product is measured by alternating-current fed lamps in successive measuring cycles of 10 msec. Immediately following the exposure, the resulting electrical charge on the diodes within a measuring cycle in a period of 200 usec used, is scanned (sampled). Scanning is always at the maximum of intensity of illumination of the lamps. The electrical charge on the diodes for facing edges may be simultaneous, and the bright-dark transitions of the projected edges may be detected in the diode lines. The diodes darkened by the rolled product are counted in the diode lines above the two edges. The resulting counts are added to the distance between facing diode lines, each of which have a bright-dark transition, to form a measured value indicating the width of the rolled product.

11 Claims, 2 Drawing Figures

ARRANGEMENT FOR DETERMINING THE WIDTH OF ROLLING MILL PRODUCTS

BACKGROUND OF THE INVENTION

The present invention relates to a method for the continuous, quasi-static and contactless determination of the width of hot rolled products inside a rolling mill train, preferably of hot broad band by means of diode line cameras on which the two side edges of the illuminated rolling mill product are projected, and a device for carrying out the method, consisting of diode line cameras arranged above the rolling mill product and fluorescent lamps arranged underneath the rolling mill product.

Methods and devices for determining the width of rolling mill products are known, see "Stahl und Eisen" 1977, No. 4, pp. 147/150. The known device consists of two diode line cameras of which one each is arranged above a train edge of a rolling band running on a roller bed. Underneath the roller bed which is arranged in a pickling device placed ahead of a cold rolling mill, light bands for illuminating the band or its edges are provided. The diode line cameras can be moved in the top portion of a frame on a shaft by means of a motor in the axial direction. With this known device with which the width of cold rolled band is measured, the cameras must be moved in a disadvantageous manner before taking a measurement from an initial position to a measuring position. Movable measuring devices which must operate under difficult conditions such as increased temperatures in an atmosphere containing dust and vapors, are only conditionally operational. However, it is not possible to secure the sensitive apertures of the diode line cameras and the transport device against these influences because a continuous gap-like opening in the apparatus housing is required for the measurements. In addition, the known device uses for illuminating the bands to be measured direct-current fed luminous lamps which result in further disadvantages. In particular, to prevent the dark zones occurring in direct-current fed luminous lamps after a short operation interval, special switching devices for polarity reversal are required, since only the fluroescent lamps conventionally operated with alternating current attain a sufficiently high intensity of illumination for the given purpose. Also, with the known device, measurements are performed with very small time intervals, where the measuring cycle depends on the bandwidth and lasts approximately 1 msec for the widest band. The electrical charge placed on the diodes of the diode line cameras is relatively small.

There also is known a measuring device for measuring the width of hot rolled material, (see "Stahl und Eisen" 1977, No. 19, pp. 927/932) where the inherent radiation of the hot rolled material is used as light source for each of the diode line cameras fixedly located on both sides and above a roller bed. Aside from the fact that measuring results are obtainable only if the rolled material has a temperature of more than 550° C. and water accumulations, tinder spots, etc. carried on hot rolled material lead to erroneous measurements, the known arrangement includes an additional camera to detect vertical movements of the band to be measured and to correct the measured width. Such an arrangement cannot be used for most operational applications, since roller beds on which the rolled material is moved have lateral restrictions through guide rulers and an observation of the transported band of the additional lateral camera is not possible.

Accordingly, it is an object of the present invention to provide a method and a device for determining the width as described and to avoid the disadvantages of the known methods and devices. The width of hot rolled material, particularly in the temperature range from 400° to 1200° C. is to be measured under the difficult conditions of a hot rolling mill and in a measuring cycle whose period is independent of the bandwidth. Constant full functioning ability is to be maintained and it is to be ensured that the width of bands which are not transported precisely in the middle of a roller bed is measured correctly and accurately.

Another object of the present invention is to provide an arrangement of the foregoing character which is substantially simple in construction and may be economically fabricated.

A further object of the present invention is to provide a method and device, as described, which may be readily maintained in service and which has a substantially long operating life.

SUMMARY OF THE INVENTION

These objects of the present invention are achieved by a method and device where the position of the illuminated edges of the rolled product is measured by alternating-current-fed lamps in successive measuring cycles lasting 10 msec, and the resulting electrical charge of the diodes is measured immediately following the exposure within one measuring cycle during an interval of 200 usec, always scanning in the maximum of the intensity of illumination of the lamps.

An advantageous development of the method of the present invention is obtained by scanning the electrical charge of the diodes for oppositely facing edges, determining the bright-dark transitions of the pictured edges in the diode lines, counting the diodes darkened by the rolled product in the diodes lines above both edges and adding the resultant counts to the measure for the distance between oppositely facing diode lines, each of which have a bright-dark transition, to form a measuring value indicating the width of the rolled product.

The device optimally suited for carrying out the method, consisting of diode line cameras arranged above the rolled product and fluorescent lamps arranged below the rolled product is constructed in such a way that above each edge of the rolled product, in a row transverse to the conveying direction, several fixed diode line cameras whose measuring ranges succeed each other or overlap, are arranged and alternating-current fed lamps are arranged underneath the rolled product; a triggering unit controlling the time measuring cycle of the diode line cameras is supplied by the alternating voltage.

In an advantageous manner, the diode line cameras are protected by a narrow-band optical filter so that the thermal radiation does not strike the diode lines. Complete functional capacity of the measuring device of the present invention is aided by providing a tube equipped with a slot aperture in front of each of the diode line cameras, the length of the tube being much larger than its diameter. In an advantageous embodiment of the measuring device of the present invention, the diode line cameras are arranged in a water-cooled housing in front of whose filter-equipped aperture the tube associated with each diode line camera is mounted.

The advantages of the method of the present invention and the device for carrying out this method are avoidance of the disadvantages of the known methods and determining the width of hot rolled products under the rough conditions of a hot rolling mill perfectly and accurately over a longer period without maintenance. The duration of each individual measuring cycle is independent of the width of the band to be measured. Also, one can accurately measure the width even of bands which are not transported precisely in the middle of the roller bed.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings.

DESCRIPTION OF THE PREFERRED EMBODIMENTS

Figure 1:
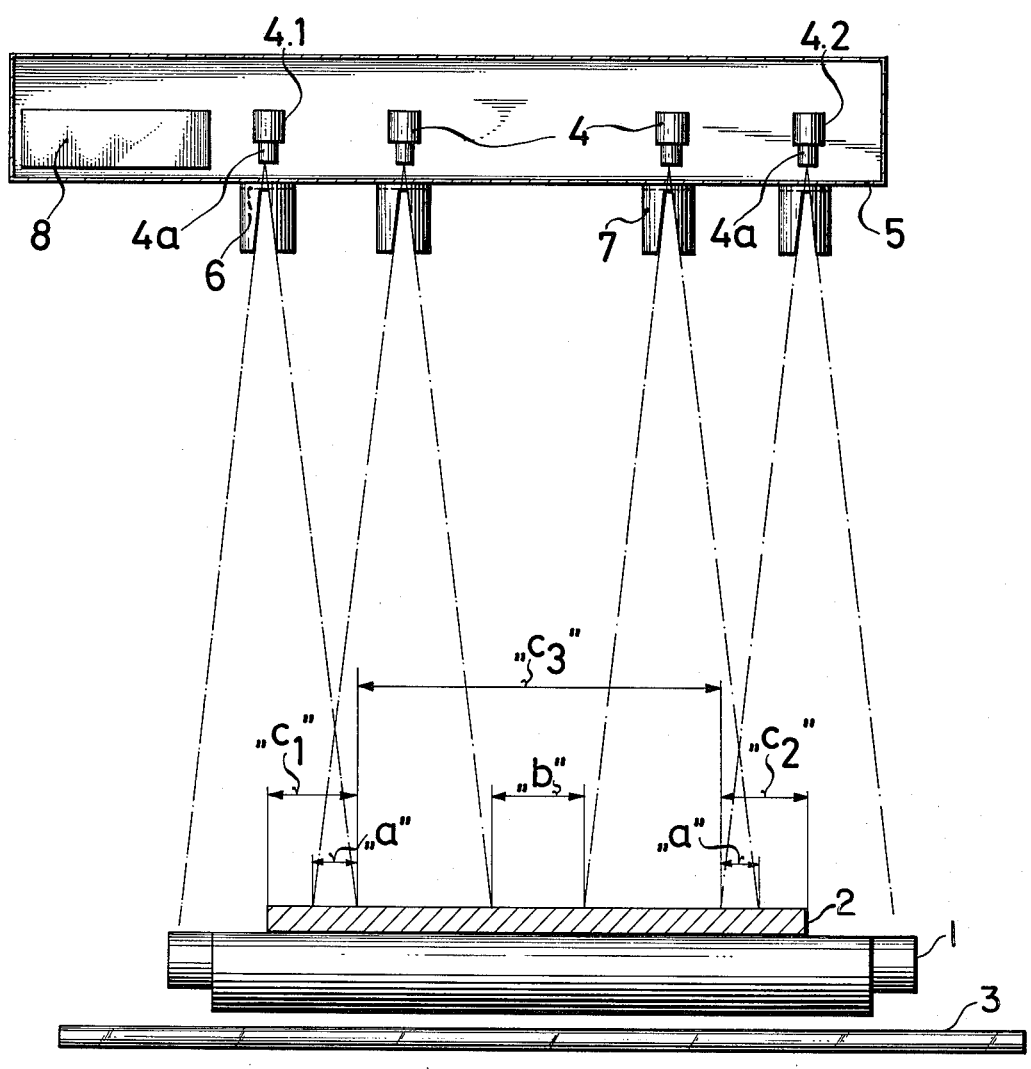
FIG. 1 shows a schematic of the measuring device according to the present invention.

Referring to FIG. 1, on a roller bed represented schematically by a roller 1, there is transported a rolled product whose width is to be measured, a hot band 2. Underneath the roller bed in a gap between two adjacent rollers 1, is a fluorescent lamp 3 operated by alternating current. The fluorescent tube 3 is located in a watertight box (not shown) whose topside has a transparent pane which is continuously flushed with water. Above the roller bed, above each edge of the hot band 2, there are mounted two diode line cameras 4 which, as shown by the aperture angles of the optical systems, overlap each other's measuring ranges by an amount "a." Between the diode line cameras 4 of each band edge, arranged in a row transverse to the conveying direction, is an intermediate stretch "b" which is not inside the measuring ranges of cameras 4. The diode line cameras 4 are arranged in a water-cooled and water- and dust-proof housing 5, with an aperture with a narrow-band optical filter 6 in front of each camera. A protective tube 7 with a slot aperture is thread-fastened to housing 5 to enclose filter 6.

Figure 2:
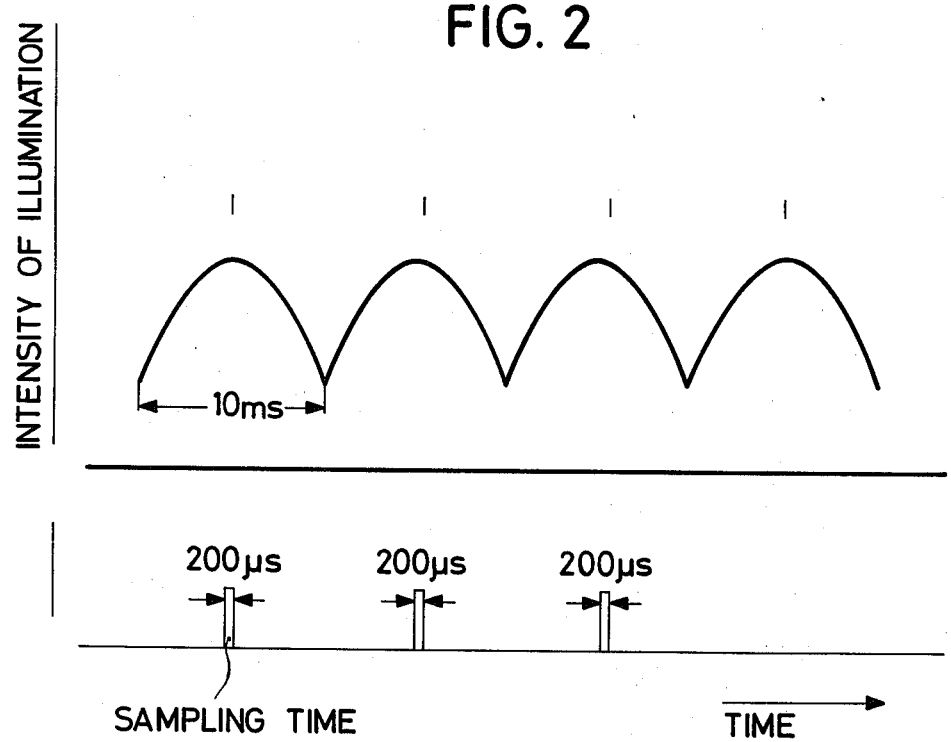
FIG. 2 shows the time cycle of successive measuring processes.

For measuring the width of the hot band 2, the latter is illuminated by the fluorescent lamp 3 so that the band edges of the hot band 2 are projected by the optical systems 4a on the diodes of the outer diode line cameras 4.1 and 4.2. A measuring cycle, including the exposure time of the diodes and the 200 usec scanning or sampling time of the diodes, last 10 msec in accordance with the frequency of the lamp supply current. From the size of the scanned electrical charge present on the diodes, one can determine whether the diode has been exposed or unexposed. If the diode is exposed, it is outside the hot band 2 to be measured; if it has remained unexposed, it is inside the width of the hot band. From the number of unexposed diodes in camera 4.1 and in camera 4.2 for each band edge, a distance "$c_1$" and "$c_2$" results. By simply adding the distance $c_3$, located between $c_1$ and $c_2$, to $c_1$ and to $c_2$, the measured width of the hot band 2 is obtained. The distance $c_3$ is given by the distance between the measuring ranges of the diode line cameras 4 measuring at that time, in the present case cameras 4.1 and 4.2. Successive measuring cycles are shown in FIG. 2; as evident from the drawing, the electrical charge is scanned (measured) or sampled at the maximum of the intensity of illumination of a measuring cycle. Scanning or sampling of the electrical charge of the diodes for facing edges the hot band 2 takes place simultaneously with the same scanning or sampling rhythm.

Each measuring cycle according to FIG. 2 is triggered by a pulse which is released by the maximum intensity of illumination of lamps 3, so that in this manner the measuring cycle of the diode line cameras 4 is controlled by the intensity of illumination of the lamps 3. For this purpose, the triggering unit 8 is located inside housing 5. The contact unit 8 may be in the form of, for example, a computer type of unit known in the art.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for continuous, quasi-static and contactless width measurement on hot rolled products within a rolling mill train, comprising the steps of: projecting two side edges of an illuminated mill product on diode line cameras, measuring a position of illuminated edges of the rolled mill product via alternating-current-supplied lamps in successive measuring cycles of predetermined time intervals; scanning electrical charge of diodes immediately following exposure within a measuring cycle of predetermined time interval, said scanning being at maximum intensity of illumination of said lamps, said scanning dependent on the frequency of current supplied to said lamps, intensity of said lamps being monitored to maintain the measurement cycle at maximum brightness.

2. A method as defined in claim 1 including the steps of scanning electrical charge of diodes simultaneously, determining bright-dark transitions of projected edges in diode lines, counting diodes darkened by rolled product in diode lines above said edges, adding counts to a measure for distance between facing diode lines, each of said facing diode lines having a bright-dark transition, said sum indicating the width of rolled product.

3. An arrangement for continuous, quasi-static and contactless width measurement on hot rolled products within a rolling mill, comprising: a plurality of diode line cameras arranged above the rolled product, lamp means arranged underneath the rolled product, said diode line cameras being fixed above each edge of the rolled product in a row perpendicular to a conveying direction, measuring ranges of said diode line cameras being successive; a plurality of alternating-current-supplied lamps arranged underneath the rolled product; triggering means controlling a time cycle of said diode line cameras and supplied by alternating current of said lamps, said diode line cameras being scanned dependent on frequency of current supplied to said lamps, intensity of said lamps being monitored to maintain a measurement cycle at maximum brightness.

4. An arrangement as defined in claim 3 including a narrow-band optical filter for protecting said diode line cameras.

5. An arrangement for continuous, quasi-static and contactless width measurement on hot rolled products within a rolling mill, comprising: a plurality of diode line cameras arranged above the rolled product, lamp means arranged underneath the rolled product, said diode line cameras being fixed above each edge of the rolled product in a row perpendicular to a conveying direction, measuring ranges of said diode line cameras being overlapping; a plurality of alternating-current-supplied lamps arranged underneath the rolled product; triggering means controlling a time cycle of said diode line cameras and supplying alternating current to said lamps.

6. An arrangement as defined in claim 5 including a narrow-band optical filter for protecting said diode line cameras.

7. An arrangement for continuous, quasi-static and contactless width measurement on hot rolled products within a rolling mill, comprising: a plurality of diode line cameras arranged above the rolled product, lamp means arranged underneath the rolled product, said diode line cameras being fixed above each edge of the rolled product in a row perpendicular to a conveying direction, measuring ranges of said diode line cameras being successive; a plurality of alternating-current-supplied lamps arranged underneath the rolled product; triggering means controlling a time cycle of said diode line cameras and supplied by alternating current of said lamps, said diode line cameras being scanned dependent on frequency of current supplied to said lamps, a narrow-band optical filter for protecting said diode line cameras, and a tube with a slot aperture in front of each of said diode line cameras, said tube having a length substantially greater than its diameter.

8. An arrangement as defined in claim 7 wherein said diode line cameras are arranged in a water-cooled housing, said tube being mounted in front of an aperture equipped with said filter.

9. An arrangement for continuous, quasi-static and contactless width measurement on hot rolled products within a rolling mill, comprising: a plurality of diode line cameras arranged above the rolled product, lamp means arranged underneath the rolled product, said diode line cameras being fixed above each edge of the rolled product in a row perpendicular to a conveying direction, measuring ranges of said diode line cameras being overlapping; a plurality of alternating-current-supplied lamps arranged underneath the rolled product; triggering means controlling a time cycle of said diode line cameras and supplying alternating current to said lamps, a narrow-band optical filter for protecting said diode line cameras, and a tube with a slot aperture in front of each of said diode line cameras, said tube having a length substantially greater than its diameter.

10. An arrangement as defined in claim 9 wherein said diode line cameras are arranged in a water cooled housing, said tube being mounted in front of an aperture equipped with said filter.

11. A method for continuous, quasi-static and contactless width measurement on hot rolled products within a rolling mill train, comprising the steps of: projecting two side edges of an illuminated mill product on diode line cameras, measuring a position of illuminated edges of the rolled mill product via alternating-current-supplied lamps in successive measuring cycles of predetermined time intervals; scanning electrical charge of diodes immediately following exposure within a measuring cycle of predetermined time interval, said scanning being at maximum intensity of illumination of said lamps, said predetermined time intervals of said successive measuring cycles being 10 milliseconds, said predetermined time interval of said measuring cycle being 200 microseconds.

* * * * *